US008740543B2

(12) United States Patent
Weaver

(10) Patent No.: US 8,740,543 B2
(45) Date of Patent: Jun. 3, 2014

(54) OFFSHORE WIND TURBINES AND DEPLOYMENT METHODS THEREFOR

(76) Inventor: Lloyd E. Weaver, Harpswell, ME (US)

( * ) Notice: Subject to any disclaimer, the term of this patent is extended or adjusted under 35 U.S.C. 154(b) by 629 days.

(21) Appl. No.: 13/125,323

(22) PCT Filed: Oct. 23, 2009

(86) PCT No.: PCT/US2009/061928
§ 371 (c)(1),
(2), (4) Date: Apr. 21, 2011

(87) PCT Pub. No.: WO2010/048560
PCT Pub. Date: Apr. 29, 2010

(65) Prior Publication Data

US 2011/0200425 A1  Aug. 18, 2011

(51) Int. Cl.
*F03D 11/04* (2006.01)
*B23P 21/00* (2006.01)
*F01D 25/00* (2006.01)
*F01D 25/16* (2006.01)
*F03D 1/00* (2006.01)
*F03D 7/02* (2006.01)
*F03D 11/00* (2006.01)
*B63B 35/44* (2006.01)

(52) U.S. Cl.
CPC ............... *B63D 35/44* (2013.01); *F03D 1/001* (2013.01); *F03D 1/005* (2013.01); *F03D 7/0224* (2013.01); *F03D 11/00* (2013.01); *F03D 11/04* (2013.01); *B63B 2035/446* (2013.01); *F05B 2240/917* (2013.01); *F05B 2240/93* (2013.01); *F05B 2240/95* (2013.01); *F05B 2260/20* (2013.01); *Y10S 415/908* (2013.01)
USPC .............. 415/4.1; 415/4.3; 415/4.5; 415/118; 415/113; 415/170.1; 415/229; 415/908; 416/9; 416/27; 416/46; 416/61; 416/85; 416/132 B; 416/153; 416/167; 416/174; 416/205; 290/44; 290/55

(58) Field of Classification Search
CPC ... B63B 35/44; B63B 2035/224; F03D 1/001; F03D 1/005; F03D 7/0224; F03D 11/00; F03D 11/04; F05B 2240/917; F05B 2240/93; F05B 2240/95; F05B 2260/20
USPC ........ 415/4.1, 4.3, 4.5, 7, 118, 110, 111, 113, 415/170.1, 229, 908; 416/9, 27, 46, 61, 85, 416/132 B, 153, 167, 174, 205, 219 R, 416/220 R, DIG. 5
See application file for complete search history.

(56) References Cited

U.S. PATENT DOCUMENTS 8,197,208 B2 *  6/2012  Sharples et al. ............... 415/7
8,322,107 B2 * 12/2012  Murata ....................... 52/652.1
8,613,569 B2 * 12/2013  Belinsky et al. ............. 405/203

FOREIGN PATENT DOCUMENTS

| JP | 2004-176626 A | 6/2004 |
| JP | 2005-504205 A | 2/2005 |
| KR | 10-2005-0096105 A | 10/2005 |
| KR | 10-0798083 B1 | 1/2008 |

* cited by examiner

*Primary Examiner* — Igor Kershteyn
(74) *Attorney, Agent, or Firm* — Preti Flaherty Beliveau & Pachios LLP

(57) ABSTRACT

A method of deploying offshore wind turbine assemblies includes mounting a wind turbine assembly horizontally on a vessel and transporting the wind turbine assembly to an offshore site. The wind turbine assembly is raised to a vertical condition at the site and attached to anchor weights. Blades are attached to the turbine head after the wind turbine assembly is in the vertical condition. In one embodiment, the wind turbine assembly can include a tower including tapered lower and upper sections joined together at their respective wide ends, a turbine head connected to the upper section, and a platform connected to the lower section. The platform includes a buoy tank partially filled with ballast to provide mass and buoyancy. A wave piercing cowling is rotatively attached to the lower section. The turbine head can include an adjustable journal bearing, scabbard blade mounts, and a gearless induction generator with flux adjusting capabilities.

24 Claims, 10 Drawing Sheets

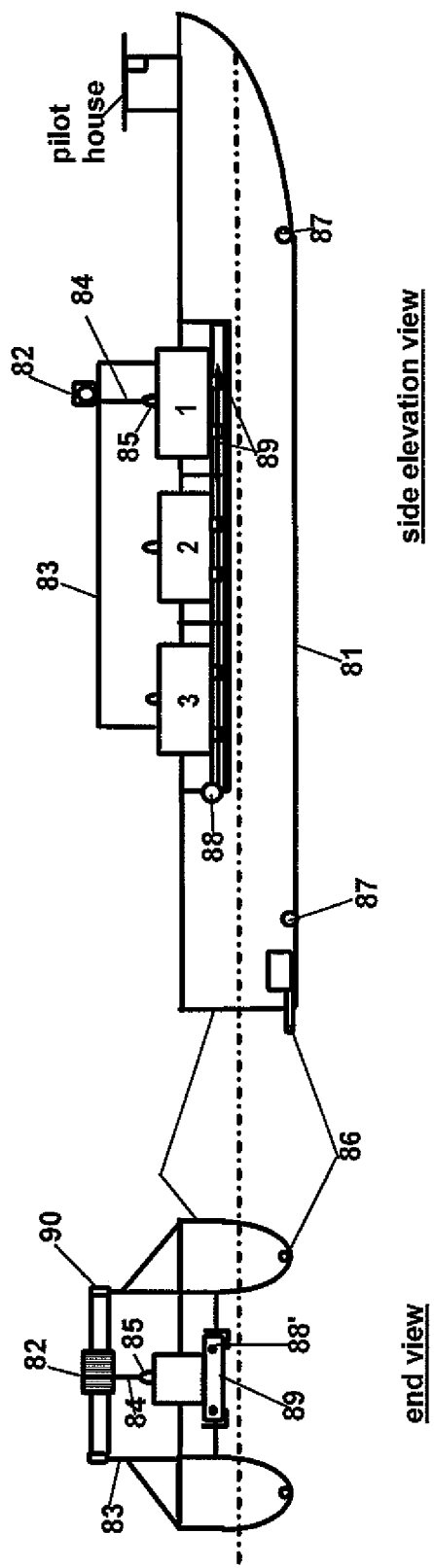

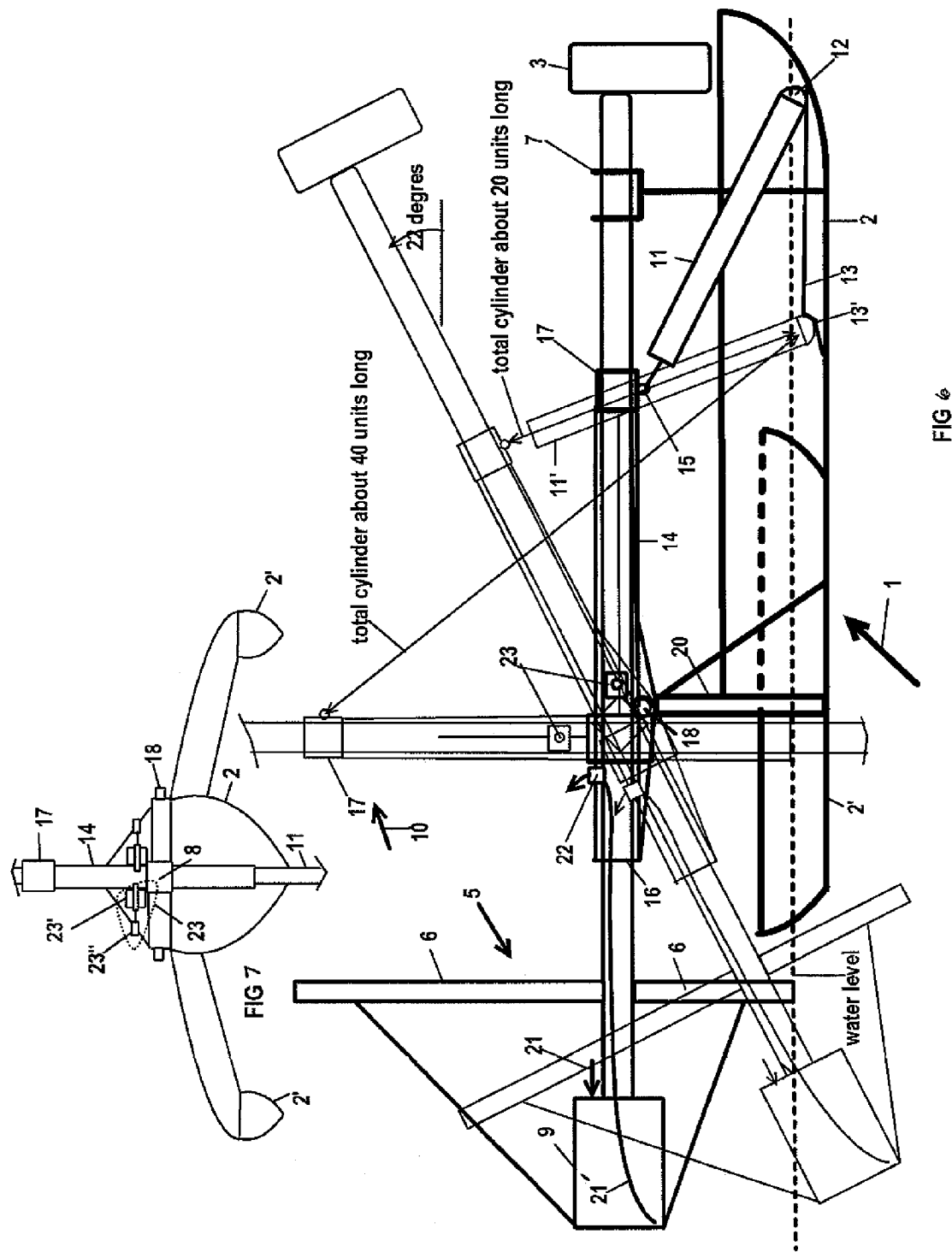

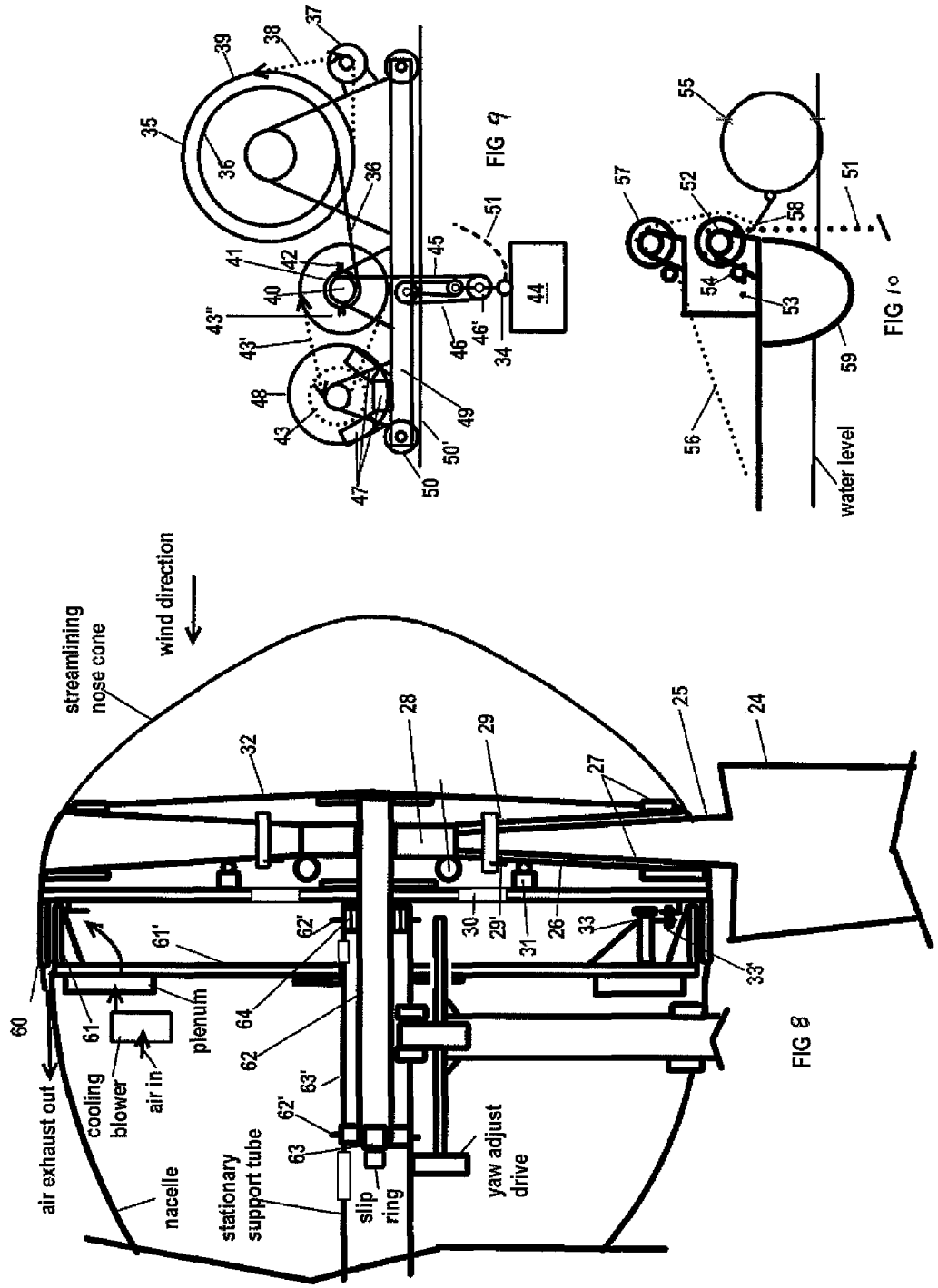

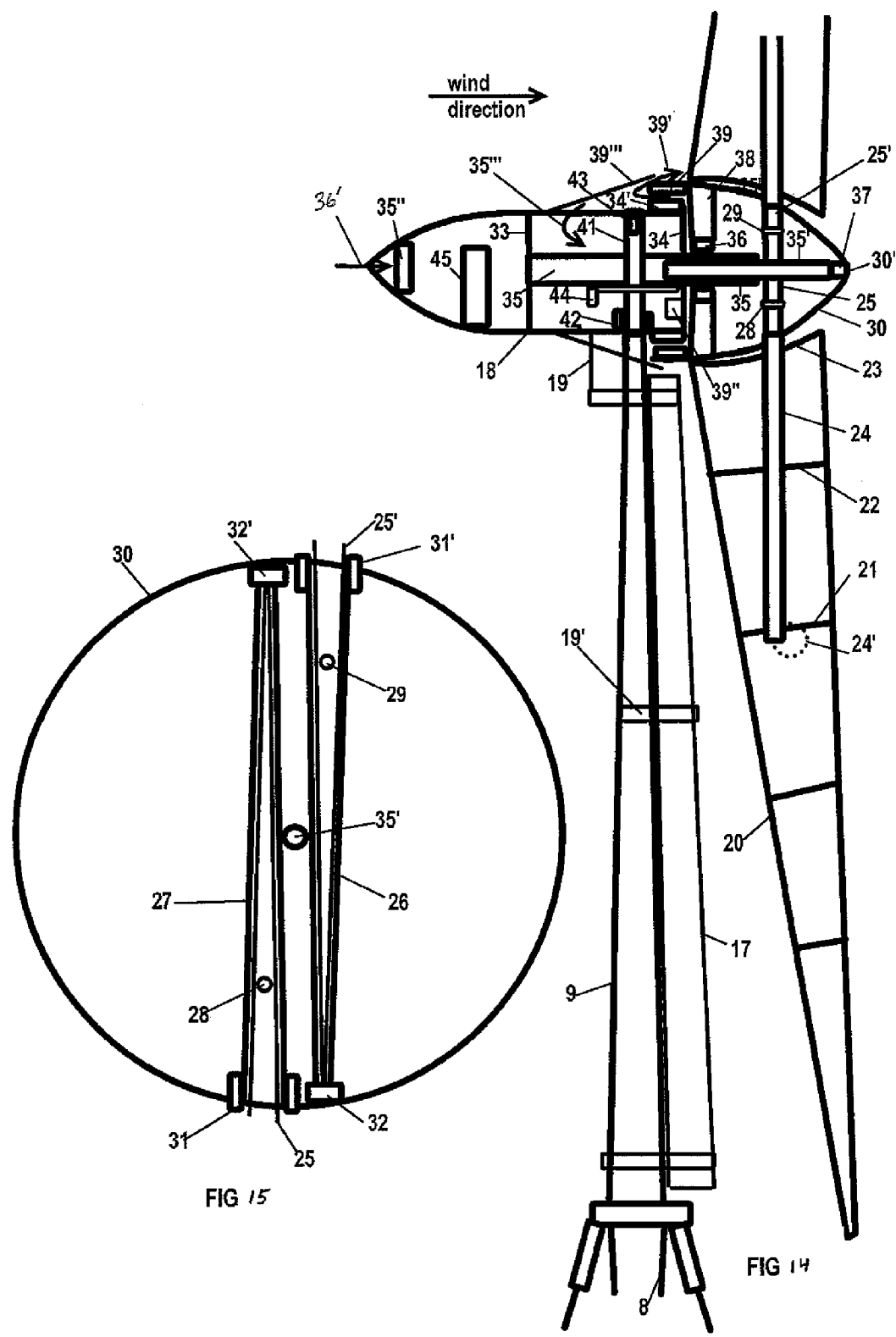

OFFSHORE WIND TURBINES AND DEPLOYMENT METHODS THEREFOR

CROSS REFERENCES TO RELATED APPLICATIONS

This application claims the benefit of U.S. Provisional Application No. 61/197,170, filed Oct. 24, 2008, and U.S. Provisional Application No. 61/270,435, filed Jul. 8, 2009, which are hereby incorporated by reference.

BACKGROUND OF THE INVENTION

There is growing interest in using wind turbines as an alternative source of renewable energy with zero or nearly zero emissions. There is particular interest in locating wind turbines at offshore sites which generally have stronger, more persistent winds than onshore sites and are not located near residences or other human activities.

The biggest problem today in achieving the promise of low cost electricity from the high capacity factor that is possible from offshore winds is the cost of deployment. For example, a new turbine and tower assembly can cost $1.5 million per MW onshore, but for offshore deployments, using monopile methods, even close to shore, will cost upwards of $2 million per MW to just deploy the turbine. At these prices, it doesn't matter how hard one works at lowering turbine costs as deployment costs destroys the cost effectiveness of offshore wind power. That is why there is so much focus on the Great Plains land systems. But the best winds and population centers are near the oceans and the Great Lakes. Thus, the cost of a 3 MW offshore turbine will be about $4.5 million, but deployment cost will be about $6 million for a total cost of $10.5 million, which is not economical. Deploying offshore wind turbines with fixed tower methods in deeper water is even more costly, and definitely unacceptably expensive with today's technologies.

Heretofore, no one has worked out an economical method to quickly transport huge wind turbines to say 15-30 miles offshore, let alone inexpensively deploy them in deep water. Accordingly, it would be desirable to develop economical methods for deploying offshore wind turbines and wind turbine assemblies that are better suited for the rigors of deep water deployments with enhanced see keeping capabilities.

Also, it's desirable to provide wind turbines with an improved construction to reduce weight and cost and increase life.

SUMMARY OF THE INVENTION

The above-mentioned needs is met by the present invention, one embodiment of which provides the following features:
1. Enhanced capacity factor by 30% by increasing generator size 50% at a low marginal cost; other infrastructure (tower, blades etc.) are unchanged.
2. Decreasing deployment cost from complicated monopile or ocean towers that take weeks and millions of dollars per turbine to install compared to special catamarans to deploy anchors and turbine tip-up and release processes, which together cost only a few tens of thousands of dollars per turbine, making deployment very economical, even in deep water such as 200 meters.
3. Shifting from steel fabricated and cast iron nacelles and hub frame systems to faster fabricated composite nacelle and hub saving about 100 tons and tens of thousands of dollars.
4. Making the blade pitch adjustable though a simple circular UHMW (ultra high molecular weight) plastic strip for a hub perimeter bearings, and supporting the blade opposite end with a self-aligning roller retainer bearings reducing pitch adjustable bearing costs from about $25,000 each blade for 12 foot diameter turn-table bearings to about $5000, and eliminating over 300 bolts per installation and enabling simple site hoist/pinning of blades.
5. Converting generator permanent magnet bearing fastening from a complicated method of six or so countersunk machine screws to two and epoxy gluing to the inside of the reinforced fiberglass composite hub made concentric by turning it within its spool-piece support bearings using a robotic actuated router to trim away excess surface resin materials.
6. Use of simple modified hollow steel tube fixed shaft to support the two spool piece hub bearing and hub and blades rotating overhanging loads, plus swiveling nacelle/hub overhanging load with the nacelle vertical support tube passing though two smaller low cost UHMW plastic strip bearings around the tower stem instead of using costly large diameter turntable bearing and dozens of bolts.
7. Eliminating cranes with a simple winch located in the stationary support tube of the hub to lift blades in place for pinning inside the rotating spool piece, and throughshafts installed in the tapered stems of the blades use simple hydraulic cylinders adjust blade pitch.
8. Simplified braking and pinning means to stop and hold the blades in position with a gear reducer that can engage a cog flame cut into the disk perimeter to position blade openings for hoisting blades and pinning them at sea.
9. Catamaran barge for fast deployment of anchor weights using GPS locating means, with traveling overhead duplex breaking winches to lower all three weights. Prior to lowering anchor weights a depth rope is lowered and with GPS positioning accurately surveys the bottom position of the anchors for purposes of pre-cutting chains to attach to the anchor eye prior to deploying to the sea bottom. The upper end of the chain is held vertical for installation by a collapsing balloon, which is deflated and removed after the upper end, is attached to the buoy wings using underwater TV and specialized robotic tooling.
10. Catamaran barge for fast deployment of turbines using the buoy volume to fill with water to help tip up the tower and gear (less blades), and then using underwater TV cameras and special tooling to attach the balloon tethered chains to rings or holes in wings attached to the buoyancy tank.

A second embodiment of the present invention provides the following features:
1. Decreasing deployment cost from complicated monopile or ocean towers that take weeks and millions of dollars per turbine to install compared to special catamarans to same-day deploy anchors and turbine tip-up using specialized ships, hydraulics and buoyancy methods for utilizing tension leg deployment technology.
2. Blade attachment times to the hub at sea is reduced by inserting the blade spade end into a pre-built scabbard and inserting a single pin, as opposed to installing numerous bolts on a large diameter blade hub, which is difficult to do at sea and whereas the much larger diameter blade hub reduces the blade efficiency.
3. Providing details of anchor weight and chain deployment for deep-water applications with holding brakes showing a 2-speed winch and wire rope spool, in effect an endless (very long) cable, to deploy turbines in deep water using a tension leg method of securing of big wind turbines against hurricanes in deep water.

4. Providing a two-sheave anchor chain method of feeding anchor chain into deep water while the cable lowers the anchor weight. Note anchor chain is not rated to the full anchor weight, so the anchor chain and sheave methods can't be used to deploy the anchor.

5. Providing advantages of trimaran methods for launching very big turbines in deep water, up to 3 MW, using fast horizontal turbine transport and fast telescoping hydraulic cylinder tip-up method with 60% reduced cylinder length and cost using a fixed link to rotating wheels attached to the back of the cylinder and the link suitably positioned and attached to the tipping up pinned at it's base. As the cylinder extends the link pulls the back of the cylinder link with it which falls by gravity into a notch in the keel increasing the torque arm available to the cylinder increasing its effectiveness.

6. The induction gearless generator has harmonics imposed over the rotational frequency, which varies with blade speed, to adjust flux to maximum permissible levels. This enables the smallest size generator possible for any load design, and due to the larger iron mass (cast in sections and electrically connected on the ends) mounted on the outer diameter of the hub for enhanced cooling, at the slow speed the extra heat generated by maximizing flux is more easily dissipated by the larger laminated iron mass and its placement noted.

7. Stators will be made in salient pole sections, made adjustable to minimize the air gap of the generator.

8. Finally, bearings for big turbines are shifting to journal bearings to make them quieter and to reduce costs. This invention has an adjustable journal bearing with coated porous surface shaft outer surface, but the outer hub is adjustable in diameter with a steel band inside as a running surface. Lubricating oil can be introduced in any number of standard ways.

A third embodiment of the present invention provides the following features:

1. A turbine tower is held vertical by guy-wire cables (3) connected from near tower center maximum diameter position to the submerged platform stationary support wings below enabling the tower to taper in its upper and lower sections with rotatable cowlings each end. This enables a smaller average tower diameter and greatly lowered wave and wind force impacts on tower and mooring systems at sea, or similarly on foundations on land, reducing foundation and tower weights and cost, and making installs easier.

2. Tension legs maintaining turbines in vertical position are well known, but this invention also adds a fast response automatically controlled triple cable varying tensioning means using force amplification to maintain the turbine in a fixed position in the horizontal plane under varying wind and wave force conditions to eliminate varying horizontal position whiplash effects to the turbine from these varying forces. Without this feature, offshore turbines in big storms could shake to pieces. This feature thus avoids catastrophic loss of the turbine from big storms and should decrease insurance costs.

3. A downwind generating head has two opposite blades which are offset such that the blade spar spade end extensions can insert into the tapered scabbard mount extending the full diameter of the hub (i.e., entirely across the hub) to minimize the forces on the outer scabbard sleeve bearings, such force spreading also minimizes blade force dip effects as the blade passes the tower. One less blade reduces blade costs and force reductions increase blade life.

4. Flexible scabbard hub bearing with mount is designed to flex and dampen blade force dip or shock as it passes by the tower. Blade force is also minimized with tower streamlining and faster blade rotation, thus shorter blades are applied. This minimizes fatigue failure effect on blades and hub bearings increasing life cycle thereby reducing costs.

5. Because it is a downwind turbine, a smaller lower cost yaw drive is needed which mounts between horizontal hub bearing support tube pivoting nacelle attached to the stationary tower, saving cost and weight.

6. Being more cost effective with more generally available parts gearless induction generator is specified with variable flux control using voltage harmonics of blade frequency imposed on the stator coils. Enhanced flux with adequate cooling can reduce the active weight of the generator, which is desirable for offshore installations.

7. In addition, other means to reduce the active mass are used such as increasing maximum blade rotational speed to 30 rpm. Rotational hub mass is further reduced with simpler blade spade mounts, lighter and lower cost greased plastic HDPE sleeve bearings, greater blade force distribution in the hub, and composite construction.

A fourth embodiment of the present invention provides the following features:

1. To increase seakeeping and reduce anchoring requirements, the nacelle and hub are streamlined and the turbine tower has upper rotating cowling to minimize wind forces and lower rotating wave piecing cowling to minimize these forces.

2. The lower buoy volume is much increased, adding little to marginal cost, but the increased mass greatly reduces wave induced oscillating accelerations, thus minimizing tower-oscillating movements. Without this feature, offshore turbines in big storms with high waves would likely shake to pieces.

3. To further increase seakeeping ability from first order oscillating wave effects, a fast response automatically controlled electric thruster is sensor optimized to counteract both plus and minus wave forces.

4. A flexible scabbard outboard or hub bearing is installed to dampen wind force effects as it passes by the tower, which will reduce fatigue forces on the blades to maximize their life cycle.

5. Because it is a downwind turbine, savings occur not only because a smaller lower cost yaw drive is needed, but also a downwind turbine stays better aligned than upwind turbines maximizing power output. Also, upwind turbine controls execute a downwind blade orientation in big storms, but since real data shows essentially no difference in efficiency compared to an upwind turbine, this invention standardizes on a downwind design.

DESCRIPTION OF THE DRAWINGS

FIG. 3 is a partial frontal view of a side-to-side triangular tower stabilizer used with the turbine assembly of FIG. 2.

FIG. 4 is a side partial sectional view of a telescoping and lifting tower stabilizer used with the turbine assembly of FIG. 2.

FIG. 5 is a side and rear partial sectional view of a number of anchor weights on the catamaran barge, for both transporting and deploying the weights to the sea bottom.

FIG. 6 is a partial side sectional view of another embodiment of a wind turbine trimaran launch process.

FIG. 7 is a partial frontal sectional view of the trimaran turbine deployment of FIG. 6.

FIG. 8 is a partial side section view of another embodiment of a turbine head illustrating a scabbard method of securing turbine blades.

FIG. 9 is a side and partial sectional view of a reversing 2-speed anchor winch with disk holding brakes and wire and in effect an endless cable spool to deploy in deep water.

FIG. 10 is a partial sectional view of anchor cable lowering winches and cable storage and chain winch and sheave lowering units.

FIG. 14 is a partial elevation sectional view of the head and blade aspects of the wind turbine of FIG. 13.

FIG. 15 is a partial cross sectional view of the hub of FIG. 14, illustrating the full diameter side-by-side scabbards to accept the blade spade ends.

DETAILED DESCRIPTION OF THE INVENTION

Figure 1:
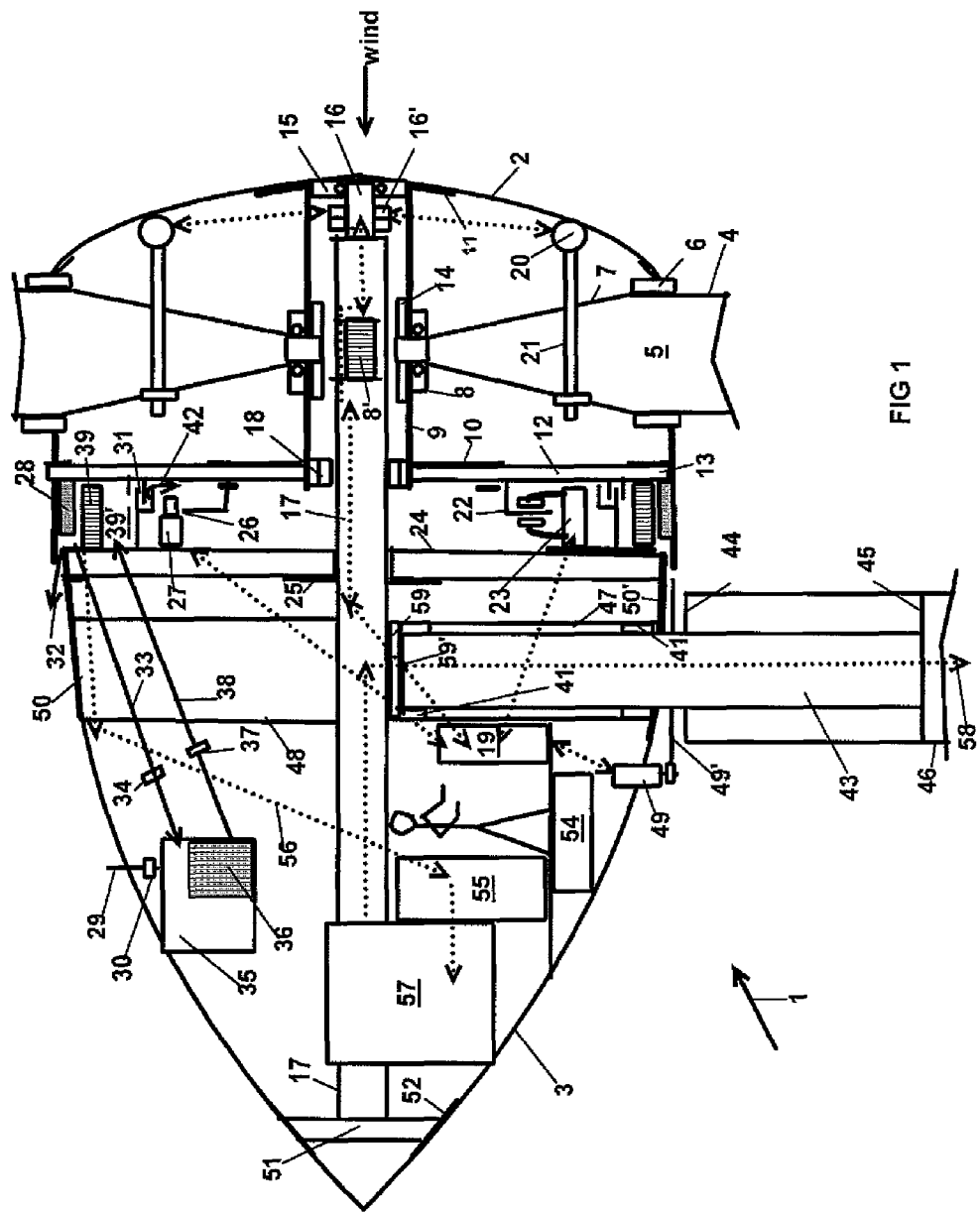
FIG. 1 is a partial sectional view of one embodiment of a turbine head including a wind turbine nacelle and hub.

Referring to FIG. 1, turbine head 1 is comprised of two main elements: a rotating hub 2 and a post supported back nacelle assembly 3, with yaw adjustment, for supporting the rotating hub 2. One of the high cost areas of wind turbines is the turntable bearing to which the blade is bolted. It's expensive, (typically about $25,000), and at over 100 bolts each requires a lot of labor to mate a blade and hub, making blade replacement or installation extremely difficult to do offshore. The life cycle of ordinary steel balls and races is also suspect in a salt air ocean environment, even if coated. Plus the blade costs more to reinforce the stem to house a 12-foot diameter bolt circle, and it requires a tough steel bulbous hub to bolt the bearings and blades onto. The present invention eliminates all the these extra costs and problems using light weight larger diameter composite hub 2 to more efficiently withstand the high torque from blades and generator permanent magnets through to the windings to generate electricity, hence absorbing the high torque generated by the blades 4 without gear reduction. Blades 4 are still pitch adjustable with a simplified circular stem 5 passing though low cost UHMW journal bearing 6 supported by the shell of hub 2, whereby blade stem 5 has a polished stainless steel rim (not shown) that slides on the greased UMHW bearing strip of 6. To retain the blade 4 from flying out, the stem or spade 5 of blade 4 tapers at 7 with straight cylindrical end that passes though roller bearing 8 attached to the hub rotating steel shell or spool piece 9. The distance between bearing 6 and the outer diameter of spool piece 9 is what absorbs or transmits the blade torque through 6 to the periphery of hub 2. The spool ends 10 and 11 attached to outer hub shell 2 and inner composite faceplate 12, which is also attached to the outer back rim 13 of hub 2, combine to form a solid hub member 2 with spool piece 9. The shoulder end of tapered portion 7 passes though bearing 8 and is retained by a collar or pin 14; this pin 14 holds the pitch adjustable blade 4 from flying out due to centrifugal force. The front end of spool piece 9 is supported by the rotating outer race of roller bearing 15, the inner race of which is attached to the end of a stationary support stem 16 of stationary though-shaft 17 also supported at the rear of the back nacelle assembly 3. The back end bearing of spool piece 9 is supported by journal bearing 18, the inner race, if used, is attached to stationary shaft 17, and the outer race of which is attacked to the end of rotating spool piece 9. As noted, the spool piece 9 then becomes a rigid part of the larger hub shell 2 and is free to rotate on the two bearings 15 and 18 mounted on the stem shaft 17, like both faces of a pinwheel on its stationary pin. And, since the main bearing 18, being a journal bearing (lubrication oil system not shown), has low noise characterizes and can be made non-conductive compared to steel bearings with races and balls, it advantageously will not experience surface degeneration from eddy current effects of generation. Or, a wide bearing strip with high PV rating and hardened and polished surface 17 could preclude the need of a more expensive journal bearing 18. The outer part of slip ring 16' on stem 16, rotates with hub 2 to bring power and signals back and forth from a controller 19 (all dotted lines to and from controller 19) to hydraulic power units (not shown) for cylinder 20, which act though blade lever arm 21 to adjust blade 4 pitch, two blades are shown here, but they all have their own pitch adjusting cylinder and angle sensors (not shown). Although the appropriate openings in shaft 17 and spool piece 9 are not shown, a person can crawl from the back nacelle assembly 3 though the hollow shaft 17 to lower the cable (not shown) of winch 8' to hoist up long blades into openings of the bearings 6 as guided by a ropes on the blade 4 tip-end from the transport ship 60 to securing blade 4 into the hub with pin 14.

The controller 19 instrumentation and control algorithms for blade pitch adjustment for synchronous generators are well known in the art, which also controls calipers 23 for brake disk plate 22 and cog gear motor 27 attached to the composite face plate 24 which is also attached to stationary though-shaft 17 with flange 25. Brake disk 22 has cogs 26 (not specifically detailed) which can be engaged by gear motor 27 to rotate hub 2 with one, two, or all three blades 4 inserted in hub 2, overcoming the blade weight torque and ultimately hold hub 2 stationary by calipers 23 for blade changes or removal for maintenance. The back inside rim area of hub 2 has circumferential permanent magnets 28 attached by cap screws and epoxy glue.

Turning now to back nacelle assembly 3, it's desirable to balance the cooling air flow from air handler and conditioner 35 feeding cooled air through absolute filter 36 and then though measuring orifice plate 37 and line 38 back up to magnets 28, circumferential windings 39, and the surrounding space 39', thereby cooling them. Return air passes by the magnet/windings face though line 33 and orifice plate 34 (circular plenums not shown). The intake side of the blower (not shown) intakes air 29 through damper 30 whose position is controlled by the difference in feed and return orifices 34 and 37 insuring there is always a small amount of air bleeding out as 32 and 42, i.e. there is always a positive pressure in the winding/magnet space 39' insuring no contaminated air ever enters. Labyrinth 31 has a higher airflow resistance than the exit diametrical space between hub 2 and shell 3, which insures positive exit airflow 32 based in intake airflow 29 to prevent outside elements entering that space. Brake dust from calipers 23 therefore also cannot enter the magnet/winding space 39', maintaining clean-room-like conditions within space 39' at all times by absolute 99.99% filter 36. Just as the hub does not utilize turntable bearings to support blades 4, turntable bearings are also not used to rotatively support back nacelle assembly 3 to turn blades 4 into the wind. Head 1 is supported by UMHW bearing strips 41 and 59, with bearing strip 59 being a thrust disk. These run on corresponding polished surface areas of fixed mast 43 welded to plates 44 and 45 of tower 46. Since tipping forces from hurricanes are directly proportional to wind pressure (round tower 46 has a drag coefficient of 1.0), high strength steel is used to reduce its diameter. The other shell 47 of back nacelle assembly 3 houses the bearing strips 41. The shell 47 also is welded to vertical channels 48 (details not shown), which are attached to the back nacelle assembly 3 at the top plate 50 and base plate 50'. Gear head 49 attached to back nacelle assembly 3 drives the head 1 into the wind though chain and sprocket 49'. Like the face plates and spool piece, these are also reinforced areas of molded composite shells 2 and 3. The back end of shaft 17 is supported though strongback 51, also connected to plates 52 attached to the shell of back nacelle assembly 3. Rounding out the turbine is auxiliary power unit 54, IGBT units 55 to correspond to coil sections of windings 39, power from coils 39 feeding in as 56, then on to transformer 57 and out to high voltage power cable 58 down though a center opening 59' in thrust bearing 59 and down tower 46 in the same cable 58. The weight reduction effects of very lightweight hub shell 2 and back nacelle stationary shell 3, thin walled through shaft 17 and spool piece 9 with lighter and smaller bearings, larger diameter hub 2 to enable faster peripheral permanent magnet speeds and thus higher frequency and thus higher voltage for smaller windings lowers the head weight of 1 to over 3 times conventional heavy cast iron or forged generator hub supported wind generators.

Figure 2:
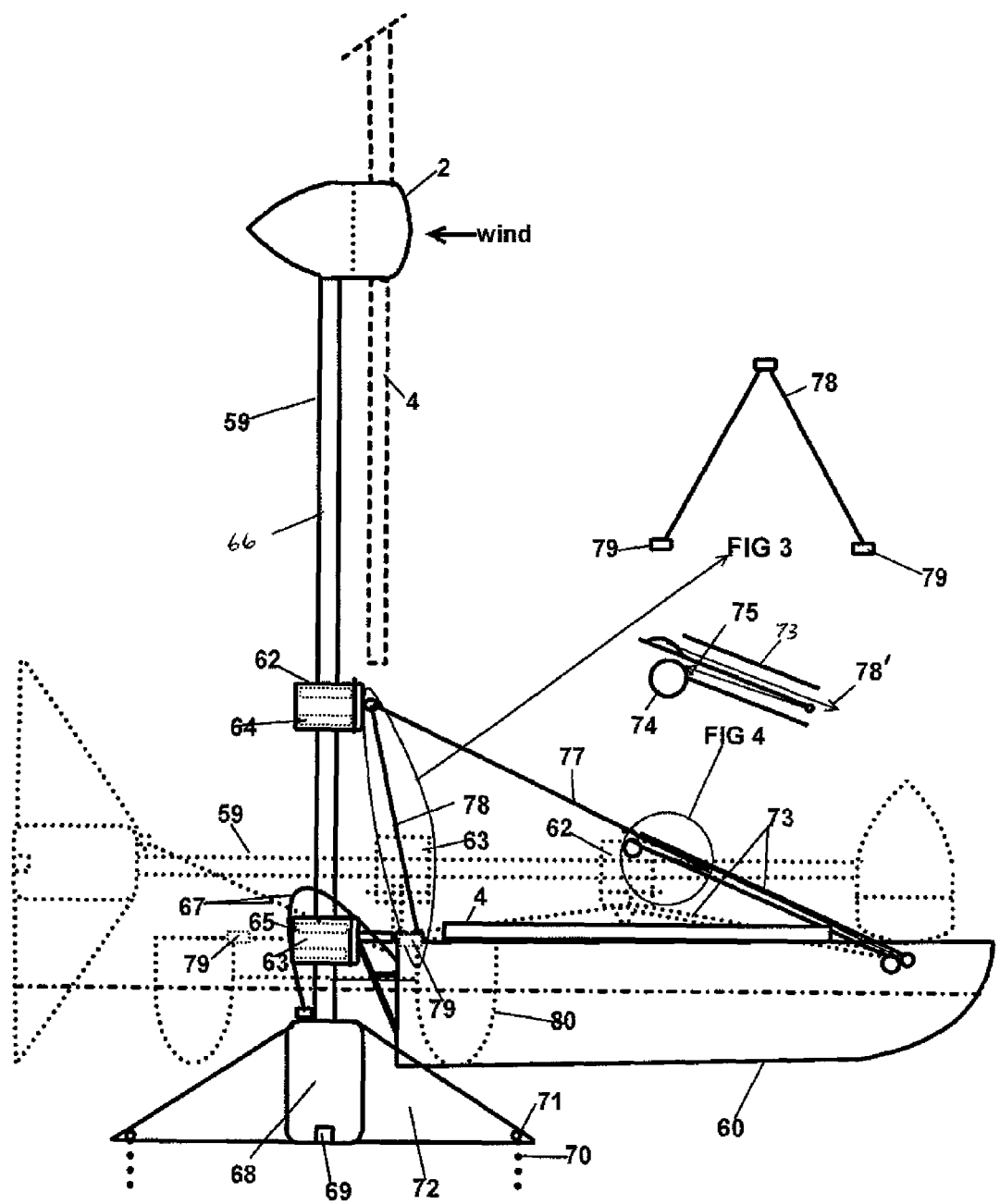
FIG. 2 is a partial sectional view of one embodiment of a turbine assembly (comprising a tower and the turbine head of FIG. 1) on a turbine deployment catamaran barge, both transporting and deploying the turbine vertically.

Referring to FIG. 2, another major advantage of this invention is its fast, low cost offshore deployment methods. For example, up to $2000/KW in offshore installation can typically be saved since turbine assembly 59 can be deployed (anchored) and blades separately installed within one day. Because the blades 4 can be hoisted up and simply pinned into the hub 2, cranes are not needed at sea to lift a complete hub and blade assembly. Hence it's possible to fast deploy a connected tower and head assembly 59 manufactured on shore and loaded on a fast catamaran deployment barge 60 using a pier-mounted crane (not shown). Turbine assembly 59 is shown lying on the barge 60 as dotted lines and held vertically (solid lines) by roller clamps 62 and 63. Roller clamps 62 and 63 have individual rollers 64 and 65 respectively curved around the cylindrical tower 66 so that when air through line 67 forces water from the under water buoyancy tank 68 though a valve 69, chains 70 (only two shown, but typically three in number) are quickly tighten to design loading and the tower 66 is then raised vertically, thereby tensioning chains 70. Chains 70 are pre-held in position with balloons (not shown) connected below the top link, the top link attached to attachment wings 72 on the buoyancy tank 68 (three in number, 120 degrees apart, two shown). The balloons are deflated and removed after the upper chain end is attached to the buoy wings 72 at holes 71 using underwater TV and specialized robotic tooling. After all three chains are tensioned by blasting ballast water out of tank 68; the blades 4 are hoisted up and pined as described previously in relation to FIG. 1. The air compressor, valves and tank to do this are not shown nor is the pump that fills tank 68 to deploy turbine assembly 59 vertically, but those skilled in the art will understand how to design and build such sub-systems within 60. The catamaran barge 60 can then speed back to the pier to load with another turbine to deploy. When the barge 60 arrives to a site, the balloon held chains are previously surveyed and ready to robotically attach to holes 71. Thrusters (not shown) orient barge 60 and water is then pumped through large air line 67 (which serves double duty for air and water flow) until there is enough ballast weight in tank 68 to cause turbine assembly 59 to tilt upward and be at an angle to the deck of barge 60 (what this angle should be will be calculated based on the power of the winch 74 and available ballast of tank 68). As shown in FIG. 2, an extension member 77 is slidingly mounted in hollow member 73, and a first end of member 77 is attached to the roller clamp 62. The winch 74 pulls on the second end of member 77 with a cable 75 to force turbine assembly 59 into a vertical condition. Also, a winch can be used to pull back on extension member 77 using cable 78' to maintain a vertical condition of turbine assembly 59 in that plane. Turbine assembly 59 is held vertically in the other 90 degree plane by triangular brace 78 with pins 79 connected to either side of catamaran 60, see dashed view 80 of catamaran 60. If turbine assembly 59 leans to one side, the buoyancy of the hull of barge 60 can be adjusted, or a hydraulic extension ability (not shown) can be added to a link of chains 70. The ballast of tank 68 is adjusted to sink turbine assembly 59 to attachment to holes 71.

Referring to FIG. 5, the purpose of catamaran ship 81 is to previously transport and deploy anchor weights #1-#3 at the site in preparation for barge 60. Gantry winch 82 on rails 83 positioning itself over anchor #1 first, and cable 84 is connected to anchor ring 85. Anchors #1-3 are marine concrete anchors to last underwater by adding ground slag and rubbery substances to the concrete so water doesn't penetrate to deteriorate the concrete and coated steel-reinforcing rod. Thrusters 86 propel ship 81, and with side thrusters 87 enable ship 81 to be accurately held in position as anchors #1-3 are deployed. At the site, a depth sounding and GPS survey location is taken. A chain pile (not shown) is cut to length and attached to the anchor eye 85 along with a winch line 84 end hook (not shown), which can be remotely released (hook and line methods not shown but well understood in the art), and a chain support balloon (not shown) is attached to the chain near the top chain link. The gantry winch 82 raises anchor #1 partially, and the end winch 88 (not shown in end view) and cables 88' pulls back the respective anchor support timbers 89, and winch 82 then drops anchor #1 and an inflated chain support balloon is pushed overboard and is pulled down with the chain, but is of sufficient buoyancy to hold the chain vertical for later attachment to the wings 72 of the buoyancy tank as described in connection with FIG. 2. With the anchor weight in position, the winch hook is released, and the winch line is hook retrieved. The catamaran maneuver jets 86 and 87 accurately position the ship 81 for deployment of anchor #2 and a new survey and chain length is calculated. Gantry winch 82 driven wheels 90 reposition gantry winch 82 over anchor #2, and the above procedure is repeated until all three anchors are placed. This procedure will only take a few hours and ship 81 speeds back for another load of anchor weights.

As can be seen, the combination of lightweight turbine head 1 and fast deployment barges 60 and 81 dramatically reduces the cost of offshore turbine installations, making it comparable to land placement if not less costly overall since anchoring is fast and lower cost, i.e. there are no cranes or road building needed for cranes, there are no land costs involved, and high voltage underwater cable cost is comparable to overhead lines at about a million dollars per mile.

Referring to FIGS. 6-12, another embodiment of a wind turbine system and off-shore deployment process is described. One of the difficulties of deploying a horizontally stored turbine system at sea is that tilting it up is a mathematically difficult problem for a typical triangular hydraulic cylinder arrangement since when the load is horizontal the cosine of the zero angle is one (1) or maximum lift is required, but when it is vertical, the cosine of the 90 degree lift angle is zero (0) hence no lift force is required. The challenge is to devise a simple force system including a triangular hydraulic cylinder arrangement that approximates the reverse of the cosine function but when the load is vertical leaves an angle between the lift cylinder and the load (turbine tower and head) to hold it in position while it's deployed.

Referring to FIGS. 6 and 7, deployment trimaran ship 1 is capable of transporting turbine assembly 10 (comprising turbine head 3, tower 4 and platform 5) to and from the site at high speed (e.g., 25 mph or faster) and can deploy at site a turbine so quickly that it can do an offshore turbine in less than a day when anchors are pre-deployed. Platform 5 is comprised of buoy unit 9 and three equally-angle spaced wings 6 for chain connections. Ship 1 (forward propulsion and side thrusters not shown) has main center hull 2 and side stabilizing hulls 2', wind generator head 3 is nested forward for transport purposes in "U" shaped rest 7. Assembly 10 is also nested in "U" trough 14 and secured on the backside of trough 14 by grapples 8 and 17. Compartments in hull 2 and pumps to transfer ballast water from stern to bow compartments and back to levelize hull 2 as the angle lift of turbine assembly 10 takes place, are not shown but would be required, as turbine assembly 10 is tilted up, and are well understood in the art.

This invention increases the efficiency of cylinder 11 by first adding ballast to buoy unit or tank 9 (pump and hose not shown) adequate to tip turbine assembly 10 to about a 22-degree angle as shown. In this way, a longer cylinder 11 fits in the space allocated, and when turbine assembly 10 is at 22 degrees, the rounded back end 12 of cylinder 11 is pulled up plastic lined slide 13 into keel notch 13'. At this point, buoy tank 9 and the lower part of tower 4 as needed are fully flooded so no void space causes resistance to the force action of cylinder 11 as now in position 11' to complete the raising of turbine assembly 10 to a vertical position as trough 14 and grapples 8 and 17 holding turbine assembly 10 as it pivots around pin 18. Grapples 8 and 17 and the extended end 16 of trough 14 prevent excessive bending stresses on tower 4 when filling buoy tank 9 to reach the 22 degree angle. Also, hull 2 can be tipped deeper at the bow to assure rounded end 12 drops into notch 13' for the filling of buoy tank 9. Cylinder 11 in position 11' can now nearly maximize its thrust efficiency, hence making the cylinder 11 smaller and less costly. Also, collapsed, cylinder 11 is shown as 20 units long, and when raised as 40 units long, this will require a telescoping cylinder 11 as shown, but this telescoping arrangement also further increases system efficiency as less oil volume and pressure is needed at the top of the rise to achieve a vertical position for turbine assembly 10. The buoyancy of the two outriggers 2' is designed to satisfy the side-to-side stability of turbine assembly 10 prior to connecting the tension leg chains to wings 6.

When turbine assembly 10 is vertical as shown, valve 22 on tower 4 is opened and a source of air pressure 21 (compressor, tank, and hose not shown), forces all the water from tank 9 though hose 21'. At some point during this process, the opposite and loose fitting (into holes of tower 4) cantilevered pins of 23' (see FIG. 7) become loose in the larger reinforced holes of tower 4 (openings encased inside so the holes in tower 4 are weather tight when the pins are withdrawn), then hydraulic cylinders 23" can easily withdraw the pins of 23'. When lifting turbine assembly 10, these pins transfer all the weight of turbine assembly 10 to the main pivot pin 18, which extends across the stern of hull 2 as seen in FIG. 7, and pin 18 also absorbs the thrust of cylinder 11.

Figure 11:
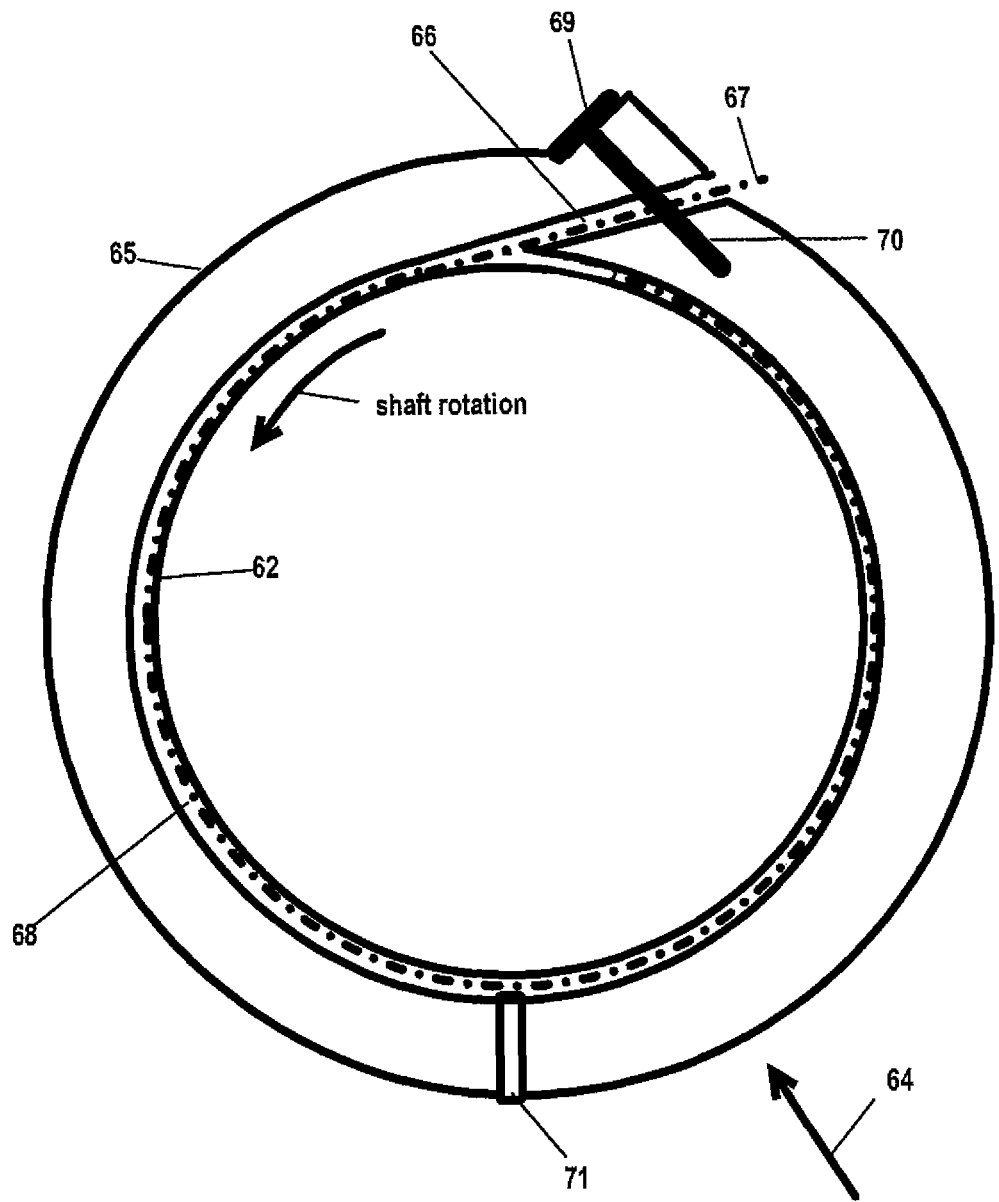
FIG. 11 is a partial section view of the adjustable main journal bearing for a gearless turbine.

With turbine assembly 10 vertical, the balloon supported chain ends can be pinned to the ends of wings 6 (see FIG. 11). To do this, smaller balloons would be inflated by the divers to lift the dangling chain end (described in connection with FIGS. 9 and 10 below) to assist lifting the last link of the chain to pin to the ends of wings 6. Once all chains are pinned, all water is blasted from tank 9 though hose 21' and valve 22 from air pressure source 21 which raises turbine assembly 10 whereby buoy tank 9 with increasing buoyancy force raises tower 4, which slides up though the grapples 8 and 17 and inside the "U" shaped walls of trough 14, placing full design tension to the chains as shown in FIG. 10. Once turbine assembly 10 is fully deployed, the balloons holding the chains can be deflated and retrieved by the divers. Grapples 8 and 17 are then opened and ship 1 is free to drive away from turbine assembly 10 whereby it can be positioned and held adjacent to tower 4 to enable winching up and installing deck of two stored blades 24 (not shown). The elevator of the head unit 3 (not shown) is lowered and a crew goes up to the hub and systematically winches up blades 24 for attachment (see discussion in connection with FIG. 8). Thus, with the blades pinned in place; the complete assembly 10 with blades is launched and will withstand hurricane force winds. The blades 24 of head 3 are adjusted to a zero torque mode and the rotor brake secured and the head can trail in the wind (wind passing across the back of the blades) so the yaw adjusting motors do not have to operate until cable crews arrive to wire the turbine to the underwater power cable shown in FIG. 11 for placing the turbine into service.

FIG. 8 depicts an alternative version of the spade method of attaching a blade to the hub by inserting the spade ends 25 of blades 24 of FIG. 8 into scabbard 26. While the spade end of blade 24 is similar to the arrangement of the first embodiment, scabbard 26 makes installing the pin easier, and the pitch adjusting actuator can then be factory assembled and calibrated. Thus, to install blades 24, hub 32 as before has greased plastic journal bearings 27, and end roller bearings 28 that secure scabbard 26, absorbing all forces. Spade end 25 of blade 24 has a hole for pin 29 that passes though scabbard 26 and is retained in position using a plate 29' in a slot cut into pin 29 as shown, with 29' cap screwed into tapped treads in the side of 26 or welded to 26 or both. Generator access openings 30 provide access to various areas such as the winch and pin operations shown. Winch 31 is used to pull the tapered spade end 25 of blade 24 into alignment to pin 29 openings. Hub maintenance drive 33 rotates hub 32 into position for the next blade opening, and the hub 32 is then held in position for the next blade install by actuating pin or brake 33'.

The anchor lowering of FIG. 9 is a more detailed view than shown in the first embodiment, and includes a reversing motor and generator and disk brake anchor load lowering assembly. It's comprised of spool 35 to store wound cable 36 dispensed with reversing motor drive 37 with roller chain 38 to the outer perimeter sprocket 39 (not shown). Wire rope or cable 36 feeds into helical grooved drum 40, which covers the wire rope with a thick sliding plastic cover 41 with screw clamps 42 enabling easy removal of cover 41. As drum 40 rotates with multiple wrapped cables 36, cover 41 slips on the outside and insures the cables cannot jump the deep helical cable grooves of drum 40 when the drives are reversed to raise the cable and pulley set 46. Multiple wraps of drum 40 and braking gear motor/generator 43 insures there is enough friction force to hold the anchor load 44 pulley set 46 which has a 4:1 mechanical advantage. There are enough wraps of rope 36 on drum 40 to insure at least a 100:1 tension ratio to prevent slippage of wire rope 36 on drum 40. Considering that the discharge cable tension 45 of drum 40 could be as high as 150,000 lbs, drive 37 feeding in cable 36 from spool 35 should be capable of supplying over 1500 lbs of continuous holding or braking force. A disk brake (not shown) could be applied to the spool 35 to assist in maintaining this tension to insure the cable 36 does not slip on the drum 40. The needed tension ratio of cable infeed 36 and outfeed 45 is estimated as $T1/T2 = e\mu\theta$ where "e" is the base of the natural logarithms, and Mu and Theta are the coefficient of static friction and angle of wrap, respectively. Thus, if the anchor load 44 is 600,000 pounds and wire rope and winch drive 43 maintains through roller chain drive 43' through drum 40 sprocket 43" a tension of 150,000 pounds in drum 40 output cable 45, the 4:1 mechanical advantage of pulleys 46 can raise or lower a 600,000-pound (300 ton) anchor 44 with cable lower pulley 46' attached to anchor eye 34, as is chain 51. Winch drive 43 has a much faster up speed to retrieve cable 36 to lower the next anchor. The lowering speed of anchor 44 would be about 10 feet per minute, which for a 300 ton anchor would generate 182 hp to be dissipated by a combination of the winch drive motor/generator 43 switched to generation mode dissipating the electricity as heat across a resister immersed in the water (not shown), and by disk brakes 47 against water-cooled hollow disk 48 fed coolant though rotary joint, not shown. Disk breaks 47 are designed to stop and hold anchor weight at any point in the descent of anchor 44. The whole assembly of FIG. 9 is supported on rolling gantry frame 49 which has drive wheels 50 that ride on ship's rails 50', thus operating like a traveling gantry crane as shown in the first embodiment. The tension leg chain 51 is maintained loose when dropping anchor 46.

Anchor chains 51 are all cut to length to match the end attachment point of wings 6 before leaving shore, such length based on water depth, tides, and expected wave surges to insure the buoy 9 of FIG. 6 is never exposed, as that would slacken the chains and possibly capsize the deployed turbine assembly 10 of FIG. 6. Detailed depth and bottom surveys for each anchor position determine the lengths carried for each anchor position. Referring to FIG. 10, chain 51 is fed by anchor chain sheave and lowering brake/drive 52. When the pile of chain 51 (not shown), gets near the end point, at say 53 of the small tightening sprocket 54, anchor lowering stops, and the balloon 55 and smaller chain 56 with its sheave lowering drive 57 are attached at the same point 58 on anchor chain 51. Continued and coordinated lowering of chains 51 and 56 to always maintain tension causes balloon 55 to be submerged by the weight of the anchor 46, and the chain link 53 of chain 51 is dangling in the water while balloon 55 is of sufficient buoyancy to keep chain 51 vertical. Note as the anchor 46 is lowered, chain 51 is always in a slack condition. At this point, the anchor would be resting on the bottom, and chain 56 is fed though to the end and sinks and is also dangled (supported) by balloon 55. Dispensed also with chain 51 is a slack electrical cable (not shown) that after feeding enough cable 45 to take the strain off cable and pulley pin connection 46', the motorized clevis (not shown) is disconnected and cable 36 and power cord cable 36 is rapidly raised and rewound on spool 35 as is the electrical cable (not shown) that operated the anchor cable clevis connection. The assembly of FIG. 10 is moved along the ships deck and catamaran hull side to deploy another anchor. As other anchors are lowered, ballast water will need to be moved to respective tanks in catamaran hulls 59 (one shown) to maintain a level catamaran as the weights are lowered one by one. Those skilled in the art of ship design and operation understand these principles and can design the hulls and ballast system of the anchor-dispensing catamaran of the first embodiment to accomplish these tasks. Balloon 55 is only deflated and removed with chain 56 when the ends of chains 56 are connected to the end points of wings 6 and the turbine assembly 10 is fully deployed as described above as in FIG. 6.

Referring again to FIG. 8, item 60 is the induction generator rotor sections, which would be bolted (not shown) through the hub casing. The rotor sections 60 forming a circular rotor would be typical laminated iron cast with aluminum conducting buss, and electrically connected together on the ends as is typical. The inside of the hub is routed precisely concentric to shaft 62 with the bearings 63 and 64 in place and forming the basis for hub concentric rotation while routing the rotor surface area. Prior to bolting the rotor sections to the inside of the hub, the rotor sections 60 are shimmed as necessary to form a perfect inner circle, and heat-conducting paste is added to the outer surface of the rotor 60 for better heat conduction to the hub. Alternatively, rotor 60 can be spaced away from the hub as air is continually forced through the stator 61 and possibly around the outer side of the rotor 60, whichever by calculation or practice is shown to have the best heat transfer basis away for the rotor, which heats up due to the high current flows to generate the high flux. Induction generators are not as efficient as permanent magnet gearless units, but the wind is free, and the flux levels of the induction generator do not degrade over time, as is the case with permanent magnet generators.

Further, the stator 61 would be of salient pole type, build in sections so if one fails it can easily be replaced, but any number of winding configurations will work. Adjustable stator units 61 are bolted to the reinforced nacelle face plate 61', and to minimize air gap are adjusted to rotor surface by radial sliding adjustment, details are not shown. Software and IGBT high current electronics are available to enable matching the generator frequency, which varies due to generator speed changes based on wind speed and load, to utility frequency regardless of rotor speed, so this is not discussed here. Also, it is well known how to superimpose on the stator voltage harmonics around the varying generator frequency, which is a means to increase (adjust) the flux of the generator to levels up to two Tesla or until heat generation requires the flux levels to be reduced, whereas permanent magnet gearless units are limited to about 1.2 Tesla, and their flux reduces over time thus reducing the capacity of these turbines. This flux adjusting technology was perfected for electric induction motors, and will be made a part of this invention to enhance generation output with a reduced sized rotor and stator to reduce cost and weight, which due to the heavy castings and generator speed increasers of geared turbines, enables this generator to be competitive if not lower in weight to geared turbines. In this way, flux levels higher than geared induction generators are possible in part due to the higher iron rotor mass and surface area, and ease of cooling air circulation compared to much smaller geared wind generators. Thus, controlling the flux to higher levels by generating harmonics electronically and imposing them on the stator coils to induce higher rotor flux levels regardless of rotor speed (main frequency) is feasible and desirable to optimize this invention's generator technology.

Referring to both to FIG. 8 and FIG. 11, another improvement of this invention is to the journal bearing 64. The back roller bearing 63 on rotating shaft 62 provides axial thrust stability to the hub as well as absorbing its share of radial loads. These days, journal bearings for the large axial loads imposed are replacing the expensive, loud, and high maintenance large diameter roller type main bearing of wind turbines because they are less costly, much quieter, and much less susceptible to induced current degrading of the bearing surface, thus can last longer, and with similar friction levels to roller bearings. Outer stationary tube 63' supports the outer races of the bearings, bearing radial retention cap screw or other standard bearing retention means 62' placed around the circumference of tube 63' as needed. Referring now to FIG. 10, which details improvements to the main journal bearing 64 of FIG. 8, outer race 65 is adjustable in diameter, thus adjusting the diametrical gap 68 of the bearing 64, by cap screw 69 (tapped into portion 70 of race 65) by varying slit or gap 66 formed in race 65. The replaceable polished outer stainless steel wear band 67, which as shown does not quite extend around the full diameter of shaft 62, and has a hole that cap screw 69 passes though, retaining it. The polished stainless steel wear surface of band 67 also prevents generator-induced currents from causing corrosion of this critical wear part. The oil film (not shown) is adjustable by gap 68. Cap screw 69 can also be equipped with a rotary actuator connected to an automatic controller (not shown) and screw 69 so adjusted based on an eddy current gap sensor feeding back a gap signal to the controller. Standards for the set point gap for gap 68 are well known. The oil film coating of bearing gap 68 feeds through lower opening 71 of race 65, and actual oil feed design details and oil pump pressures and rates, conditioning, and recycle flow are well known in the art. Oil feed should be well established before the wind turbine brake is released and shaft 62 rotations are allowed. Not specifically shown, but such long-life journal bearing shaft 62 surface coatings and finish are well known in the art. Also, the rotating shaft 62 is grounded though the slip ring depicted in FIG. 8, further preventing any corrosive effects due to stray currents, enabling a longer bearing life than with roller bearings or competing journal bearings. If bearing 64 oil is well filtered and if multiple parallel filters are automatically switched in one at a time and shutting off and isolating old oil filters (means not shown but well known in the art), and if oil additives are automatically added as needed (not shown but well known in the art), with the automatic gap adjustment noted, due to the slow speeds of wind generations this main bearing 64 can run for many years with no maintenance attention.

Figure 12:
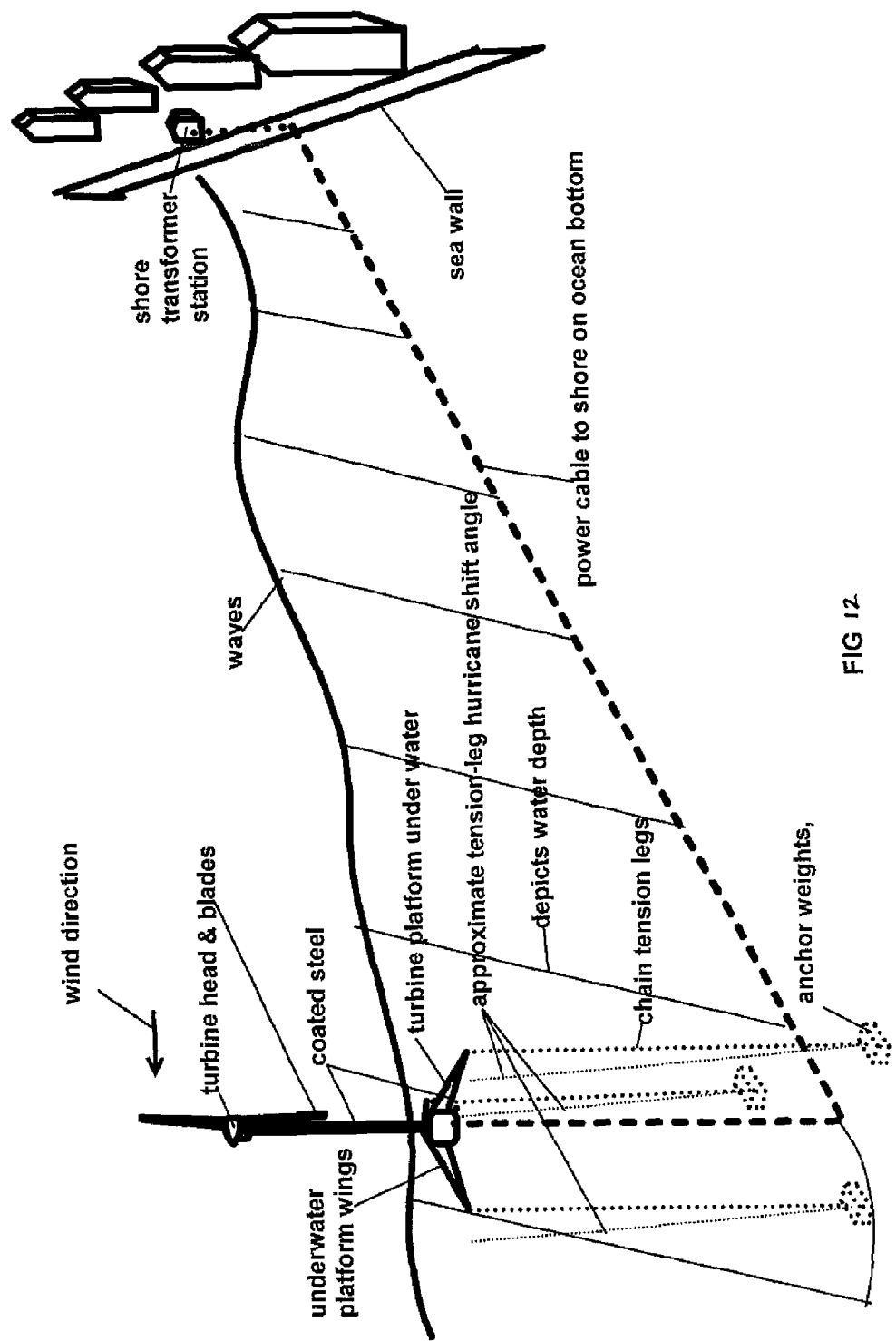
FIG. 12 is a partial perspective view of a deployed turbine with electrical energy cable to shore and shows an approximate angle of the tension leg chain angle in a hurricane condition.

Finally, referring to FIG. 12, a single turbine is shown deployed with a power cable to shore. A wind farm with many such turbines feeding a single cable to shore could be out at least 15 miles to be barely visible. Note the angle of the chain in a hurricane situation. This angle is not a problem, but can be reduced by streamlining the tower with a tapered trailing cowling on the lee wind side of the tower extending at least the radial length of the blades and rotated by and with the nacelle yaw drive. At the high Reynolds's number on a tower induced by hurricane winds, the drag coefficient of the tower is about 0.50. The best way to reduce tower drag and thus the steel required to build it is by such a cowling. As offshore wind turbines evolve, to reduce tower weight and maximize survivability in big storms, especially for large turbine designs, such tower-streamlining technologies likely will be applied.

Figure 13:
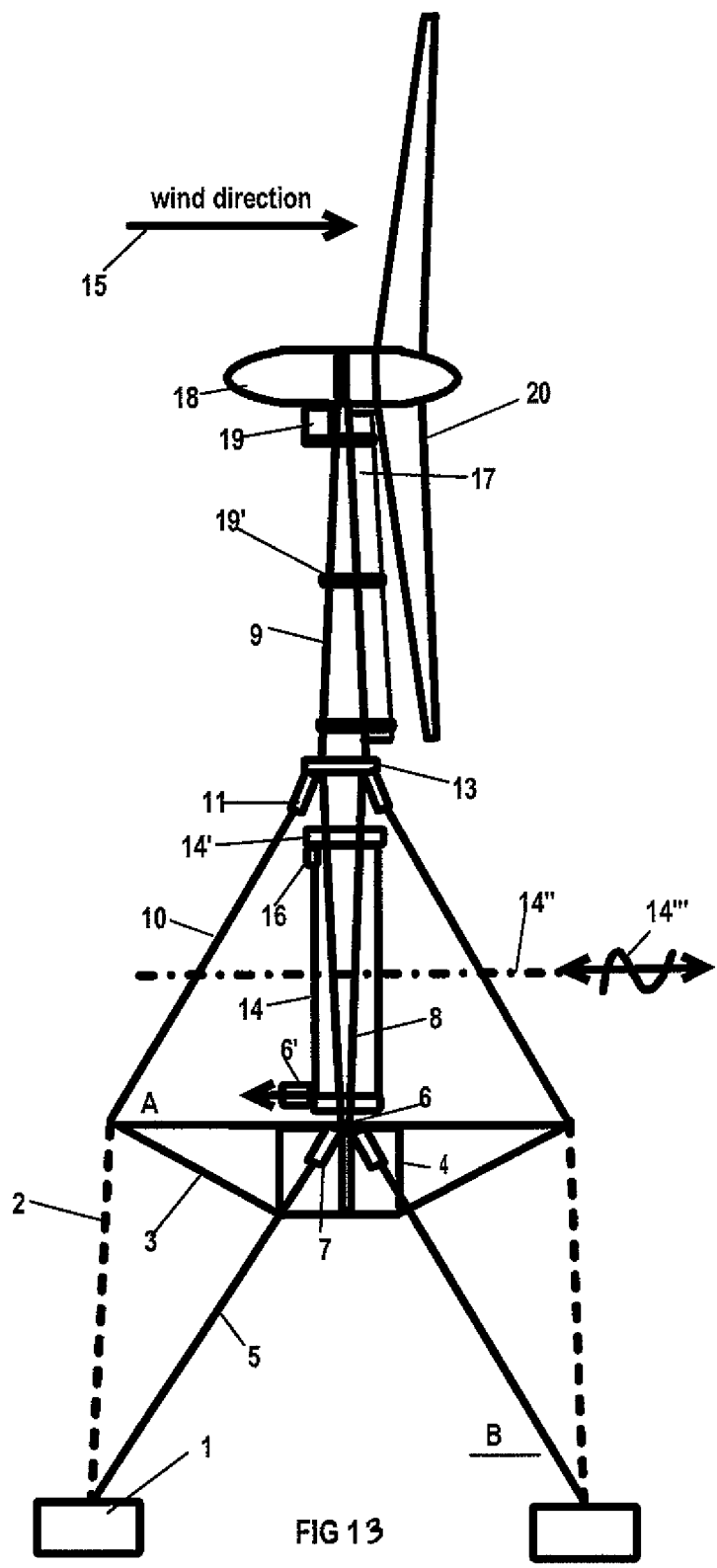
FIG. 13 is a partial elevation sectional view of another embodiment of a wind turbine with tower, anchor chain, and cables.

Referring to FIGS. 13-15, another embodiment of a wind turbine system is described. The offshore turbine of FIG. 13 is much lighter in weight and simpler to build than a combinational-geared 3-MW offshore turbine due to lightweight composite shell construction, and other changes described herein. Conventional geared turbines are much heavier because they do not take advantage of a composite shell for support and protection and have a very large inactive mass due to several large bearings and heavy castings; even the active mass is much increased than with this gearless unit described. This invention teaches much-reduced active and inactive turbine masses and other special features to optimize the design of offshore turbine systems.

This invention with gearless large diameter inductive generator seems like it should be a heavier head (nacelle and hub, less blades) than a conventional geared generator due to the higher active generator mass, but in fact it's much lighter overall due to composites and elimination of the massive castings and heavy main roller bearing gear box. For example, the combined geared turbine gearbox and generator weight is 69,000 pounds, but the active mass of this gearless generator calculates to only 55,000 lbs, not to mention the massive casting and main roller bearing necessary to support the geared turbine hub and blades, and other heavy ball bearings needed to mount the blades and tower to the nacelle. For example, modern active gearless generator masses are listed at 25 kg/kNm, and at 30 rpm that calculates to only 55,000 lbs active mass for 3 MW.

The inactive mass of this invention is also lower due to composite shell (4 lbs/sqft). And since there is no heavy rotating shaft mass (the shell takes all the torque) there is only a lightweight hollow steel tube needed to support the hub (with blades). Transformer controls and switchgear weight will be the same and is so listed in the comparison. This invention's nacelle composite casing is also the frame at 12,000 lbs, generator active mass is 55,000 lbs, other inactive mass (stationary tube and small bearings) at 10,000 lbs, transformer and switch gear is normal at 18,000 lbs or totaling 95,000 lbs, versus 194,000 lbs for the lightest conventional 3-MW turbine head. And this can be done without using expensive and dangerous to handle permanent magnets due to enhanced flux control from modern electronics achieving up to 2 Tesla of flux if necessary compared to a permanent magnets 1.2 Tesla practical limit. And gearless large outside diameter and rotor mass located there enhances cooling of the generator in hot climates, another important advantage, plus air re-circulation through an air conditioner is easier, if necessary.

This two-blade downwind blade weight is estimated at 30,000 lbs versus conventional turbine with three blades at 45,000 lbs. This is possible due to spade hub mounts so the blade is thinner, thus more efficient, and its maximum potential speed is higher at 30 rpm instead of about 19 rpm peak rpm for geared turbines. Spade mounting also eliminates all heavy and expensive large diameter ball bearing blade supports, including those for the nacelle to the tower, further the reducing inactive weight of the turbine.

It will also be less costly to transport and mount this invention's much lighter weight turbine head and tower system than conventional technology, even on land. In the Great Plains area, for example, the hydraulic cylinder tip up system proposed in the second embodiment described above, for offshore can also work to advantage by eliminating the cumbersome crane and expensive road building projects. A heavy-duty transporter could transport turbines over rough terrain on its back without roads and tip it up and support it vertically with no crane needed. This would speed up the introduction of the 200,000 odd 5-MW wind turbines thought possible for this vast region. For example, at a turbine a day, 60 odd transporters could cover the Great Plains in 10 years for a connected capacity of 1 million MW.

For this invention's guy-wire supported tower, with both ends tapered, the weight savings are even more dramatic. This slimming down of the tower is also essential to minimize wave and wind forces in a hurricane, but the much lower weight also reduces the buoyancy forces needed. This invention's tower weight is estimated at about 130,000 lbs, versus 250,000 lbs of steel for the conventional tower, which is so large at its base diameter (13 feet) that oscillating 50-foot wave forces calculate to 145,000 lbs. This large massive force shakes the big tower every 15 seconds, versus a nominal maximum wave force of about 5000 lbs for this invention due to the wave piercing lower rotating cowling and much smaller diameter tower near the platform.

Referring again to FIG. 13, the turbine is held in position offshore with anchor weights 1 (two shown but could comprise three anchors equally angle spaced in a circle on the ocean floor) with chains 2 connected to wings 3 of buoy tank 4 and whereby tank 4 has enough upward lift forces to overcome any possible overturning couple created by wind and waves through chains 2 and wings 3. Chains 2 set the vertical position of the turbine in space. And whereby automatic varying tensions of cables 5 by tension adjustors 7 (details not shown) can maintain the turbine in fixed position in the horizontal plane. Thus tank 4 must have enough buoyancy to overcome overturning couples, all dead weight, and to satisfy the total of three-position tension cables 5, which includes the maximum wind, and maximum wave force. Cables 5 in calm water conditions each will have the same tensions and are attached to anchors 1 but may require separate anchors if angle B becomes too small in deep water. And the opposite ends of 5 are connected to the center area 6 at the top of buoy tank 4 by cable tensioners 7. The total force between cables 5 does not change and the only work done is due to the inefficiency in shifting forces around. Once the decision is made to add cables 5, it then becomes necessary to provide means to vary these forces by units 7 based on a position sensor, yet keeping the total force constant. There would be a minimum tension to prevent a slack cable 5, and a maximum cable tension set to compensate for the maximum storm force needed plus a safety factor, and considering angle B, which if too small would necessitate three more anchor weights with larger diameter than 1 (not shown), totaling six in all. Force distribution to maintain a total constant force could be by air over oil hydraulics cylinders, regulating the air to vary the cable 5 forces or a thruster 6' on cowling 14 taking water from the downwind side. Since in high winds the chains 2 will create a small angle to withstand the forces in question, using a variable force thruster 6' is a cost effective way, if needed, to prevent the wave back force from causing any oscillation in the turbine.

The tower is divided into its lower tapered section 8 and upper section 9, and is guyed by cables 10 from rigid underwater platform comprised of wings 3 and tank 4 through turnbuckles 11; these turnbuckles 11 are set to overcome the combined forces of wind and waves and to hold the turbine head securely in position. Turnbuckles 11 are attached to ring 13, which is at the largest diameter and maximum bending moment area of the tower.

To minimize the viscous wave force effects, lower tower 8 has at least a 0.15 Cd (drag coefficient) steel wave piercing cowling 14 with tower cowling bearings 14'. This effectively eliminates or very much minimizes the large viscous force effect on lower tapered section 8, the wind force condition being essentially a fixed tension distribution in cables 5 based on wind velocity. This experience may show that the 5000 pounds ± of varying inertial forces on the turbine are not sufficient to justify cables 5 or alternatively thruster means 6'. For example, considering a system mass of about 300,000 lbs, a 50-foot wave acceleration could change turbine position at about 0.5 feet per second per second. And with chain and platform resistance to back and forth movement, and knowing what the oscillating wave force effect is, to determine if cables 5 and the other apparatus is needed can be simulated in a computer. While such apparatus may not be needed in practice, it is shown here as a preferred embodiment if necessary to minimize oscillating wave force accelerating effects to a turbine from large waves. Cowling 14 always rotates into the wave direction, generally the wind direction 15, by hydraulic gear motor 16. The ocean is depicted at median level 14" and oscillating wave forces represented by 14'''.

Upper tower section 9 also has a trailing cowling 17, which is connected to the windward side of composite nacelle 18 by member 19, and supported by tower warping members 19' which together enables rotating nacelle 18 to freely rotate cowling 17 around upper tower section 9 (rollers to members 19 and 19' not shown). The streamlined cowling 17 in front of downwind blades 20 will reduce its dip in force as downwind tower eddies are effectively eliminated and wind velocity is mostly recovered before reaching the blade leading edge. This will help reduce the stress effect of this force dip or pulse on the blades and ultimately on the main journal bearing 36, and roller bearing 37 (FIG. 14), which also restrains axial movement of the hub 30 though attachment to fixed shaft 35'. The higher speed and thus shorter blade 20 will also reduce the dip in force as the blade passes by the tower. Also, with equivalent cord length to a three-blade turbine, a two-blade turbine can be as efficient within 1.5 percent, if not superior in output according to some measurements, to a three bladed design.

Referring to FIGS. 14 and 15, these drawings illustrate more of the detail of the invention's turbine head. Blades 20 have rectangular spar 24 supported by ribs 21, 22, and 23. Note that the center of effort 24' is estimated (by triangulation) to be just beyond the spar 24. Spar 24 transitions into a tapered spade sections 25 and 25' that fit into pitch rotating scabbards 26 and 27 (see FIG. 15, pitch adjusters not shown), and each blade is supported from being pulling away from scabbard 26 and 27 by pins 28 and 29, respectively, the scabbards held in position by roller bearings 32 and 32' supported by reinforced outer hub 30. Note that spades 25 and 25' go the full diametrical length of the hub 30 to minimize the forces on the hub's sleeve bearings 31 and 31', which can be made to move as an assembly with a shock absorber/spring assembly within the hub perimeter bearing support or housing (not shown) to absorb and dampen the force pulsations due to blade 20 passing by tower section 9 casing a dip in force effect on blade 20 noted previously. This simple scabbard shock mounding outer sleeve bearing is an advantage to two bladed designs or even 3 blades to dampen such force pulsations, which affects blade and bearing life cycles. The smaller scabbard 25 bearing 32 and 32' attached to each scabbard would be a roller bearing to take the centrifugal force of the rotating blades though pins 28 and 29.

Bearing 37 is a roller bearing attached to the hub apex and prevents axial movement of the hub 30. Main bearing 36 is an adjustable journal assembly which rides on the outside of tube 35, which is machined round and coated with a long life absorbing journal bearing coating (lube oil system not shown). There is a smaller diameter stationary shaft 35' inside and supported by tube 35 which passes between the inside of tapered scabbards 26 and 27 allowing unencumbered rotation of the hub 30, shaft 35' passing to end hub apex support bearing 37. Hub 30 has steel reinforced composite bulkhead 38, which supports main bearing 36. There is also coolant air flow re-circulated by multiple blowers 39" as 39' entering from outside as 36' through filter 35" as needed to cool the generator components (rotor 39 and stator 34') some of which exhausts as 39' though a circumferential labyrinth seal (not shown) to prevent any elements from entering. Blower air 39' can also re-circulate air as 35''' (dampers, controls and conditioner not shown) through a cooling air conditioner mounted inside 18 to provide additional generator cooling, such systems well understood in the art.

Steel tube 35 supports main journal bearing 36 of hub 30 and end roller-retaining bearing 37. To make tube 35 centered within cylindrical composite nacelle 18, procedures are followed to find centers in composite bulkheads 33 and 34, whereby a similar concentric relationship is determined with apex 30' and bulkhead 38, finalizing a precise location for bearing 37 to maintain rotational concentricity between stationary 18 and rotor hub 30. Next, the inside of surface of hub 30 is routed circular by fixing a surface traversing router on nacelle 18 and rotating hub 30. Then a similar surface traversing router is installed on the inside of hub 30 and hub 30 is rotated around nacelle 18 to finish the stator mounting surface to nacelle outer surface concentric with the inside of hub 30 and with bearing centers 36 and 37. Then stator 34' and rotor 39 are precision fitted and through-bolted on nacelle 18 and hub 30, respectively, for minimum runout and flux gap. Streamlining cowling 39''' is then installed to deflect airflow and debris around the outside of hub 30. Also, the higher rotor speed at full power and multi-pole fractional slot stator winding 34' increases frequency, which reduces stator 34' copper losses.

The small straight diameter extension 41 of tower 9 is supported by a combination of inexpensive HDPE plastic greased sleeve bearing 42 (as used with the outer scabbard bearing) attached to lower nacelle housing 18 and upper smaller diameter roller bearings 43 attached to upper housing 18, bearing 43 takes the thrust and axial loads. Note vertical tower shaft 41 passes though stationary hub support tube 35. While the nacelle will correctly follow wind direction because it is a downwind design, it also has yaw drive 44 to insure the output cable, not shown, is not excessively twisted. The transformer and switchgear shown as 45 are standard.

There are other turbine components such as hub brakes, cog jacking and brake means to safely rotate and secure the hub for manual blade removal and/or inserting and pinning into the scabbard mounts using hoist winches in the hub, scabbard blade pitch sensing, adjustment, and actuation means, all not shown, but well understood in the art.

Figure 16:
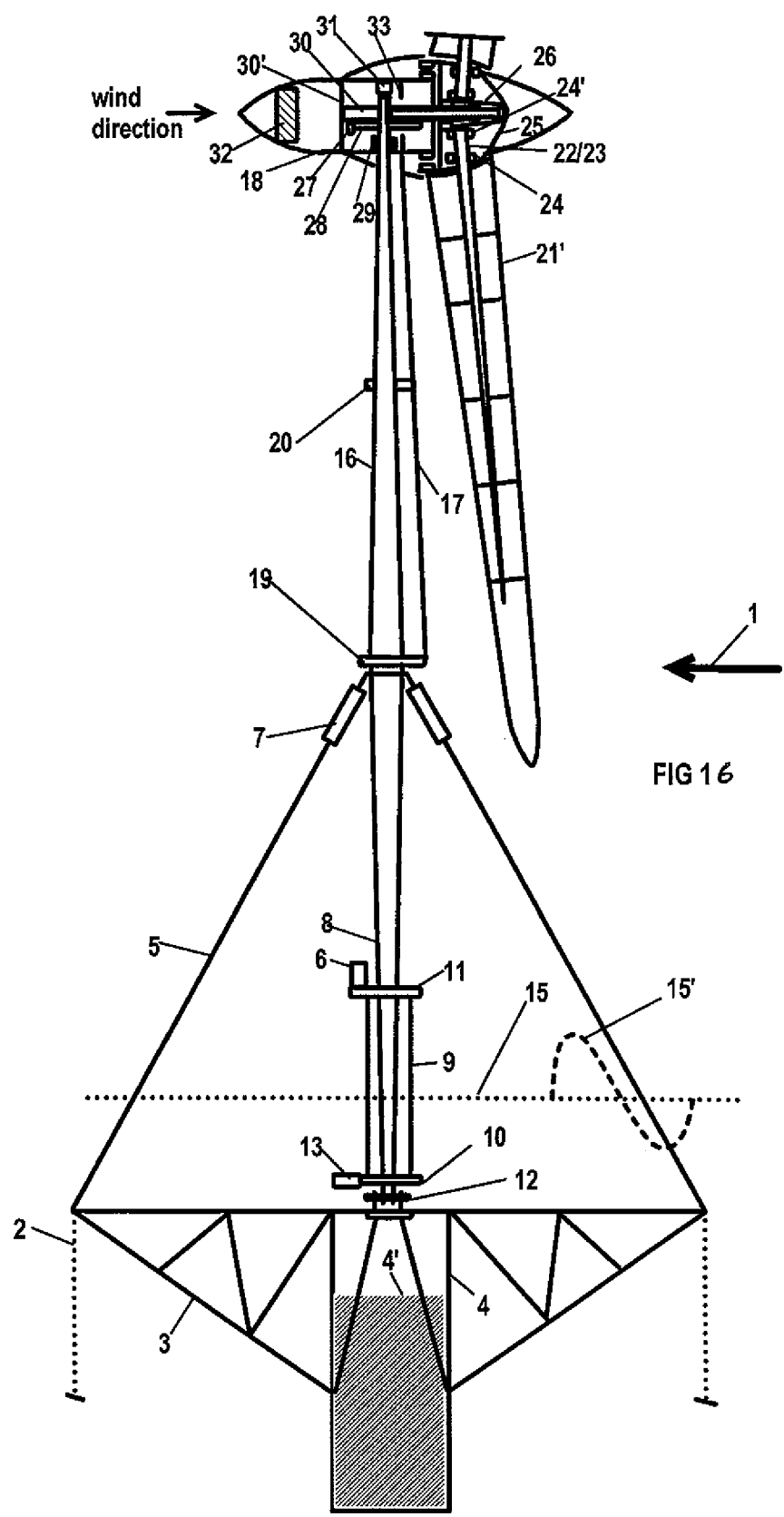
FIG. 16 is a partial elevation sectional view of yet another embodiment of a wind turbine.

Referring to FIG. 16, yet another embodiment of a wind turbine system is described. The offshore turbine 1 of FIG. 16 is a lighter weight, lower cost offshore turbine designed for best seakeeping from water ballast 4' within the underwater buoy 4, but also lower forces due to streamlining, and active sensor controlled thruster 13 (attached to cowling 9) with forces to about 5000 lbs peak further minimize wave oscillating effects to counter the plus and minus forces of wave action 15'.

In terms of stability from wave shaking forces, a lighter head and tower is better. Turbine 1 has a light head weight composite shell construction integrating both gearless stator and rotor components, and does not require heavy shafts or bearings. And since there is no heavy rotating shaft mass (the nacelle and hub shells absorb and transmit torque respectively) there is only a lightweight hollow steel tube needed to support the rotating hub with rotor and blades attached.

For example, for 3 MW, this invention's nacelle 18 composite casing is estimated at 12,000 lbs, generator active mass about 55,000 lbs, other inactive mass (stationary tube and small bearings) about 10,000 lbs, transformer and switch gear about 18,000 lbs, or totaling about 95,000 lbs, versus 194,000 lbs for a conventional 3 MW turbine head. And the gearless large outside diameter and rotor mass enhances cooling of the generator in hot climates, another advantage. Lighter and stubbier higher rpm blades 21' can also reduce upper mass. Spade blade mounting eliminates all heavy and expensive large diameter ball bearings for blade support, including those for nacelle-tower attachment, further reducing turbine head weight.

The cable 5 supports the tower comprised of lower section 8 and upper section 16, each tapered at the end, reducing weight and aiding streamlining. This slimming minimizes wave and wind forces in a hurricane reducing the buoyancy forces needed to keep turbine upright. This invention's total tower weight is estimated at about 130,000 lbs, versus 250,000 lbs of steel for a conventional tower, which is so large at its base diameter (13 feet) that oscillating 50-foot wave simulated forces would reach 145,000 lbs. This massive oscillating force would achieve accelerations exceeding one foot per second per second and badly shake such a massive tower and head combination from the short 15 second wave intervals that occur with 50 foot waves, versus a nominal maximum average wave force of about 6600 lbs or with ballast 4' combined with total mass of fabricated turbine 1, there's approximately only an acceleration of 0.1 feet per sec per second with this invention, or 10 times less potential for tower movement due to the 7.5 second half wave period that the simulation shows would be typical of a 50 foot high wave. This movement assumes no water resistance from underwater structure of chains, buoy and buoy wings, which would further dampen wave movement effects on turbine 1.

Referring again to FIG. 16, the turbine 1 is held in position offshore with three ocean bottom anchor weights (not shown) equally spaced in a circle on the ocean floor at 120 degree angles connected to chains or cables 2 (only two shown) connected to stressed wings 3 of buoy tank 4 which contains about 2 million pounds of water ballast volume 4' to resist movement of turbine 1 by wave oscillating forces, and whereby tank 4 has enough upward lift forces (buoyancy) remaining to overcome the total weight of turbine 1 and achieve a chain tension to overcome any possible overturning couple created by wind and waves. Chains 2 set the vertical position of the turbine 1 in space. But if bottom anchors sink over time, varying lengths of cables 5 at adequate tension using remote adjustors 7 (details not shown) can maintain the turbine tower in a vertical position in the horizontal plane.

To minimize the viscous wave force effects, the narrower tapered lower tower section 8 has about a 0.15 Cd steel wave piercing cowling 9, which is controlled to follow the wave direction through drive 6 and has lower bearing 10 and upper bearing 11 attached to lower tower section 8. Also, once the tower is grasped by deployment ship grabbles (not shown; described above) and sufficient buoy ballast is removed so the tower is in a floating condition, by disconnecting cables 5 and lower pin 12 the turbine 1 is disconnected from the buoy 4 which enables the deployment ship to tip down the turbine 1 onto its deck saddles (wind blades 21' removed first) for transport to shore for complete factory refurbishment.

Upper tower section 16 also has a trailing cowling 17 which is connected at its upper end to under nacelle 18, with 17 supported by the tower by bearings 19 and 20, which together enables rotating nacelle 18 with drive motor 27 part of chain and sprocket assembly 28 to rotate cowling 17 around tower section 16.

Streamlined hub 21 supports blades 21' which would be of typical composite construction with its extended tapered spade mount 22, which could be thin walled rectangular or round steel tubing or high strength carbon fiber of similar shape, pinned inside to tapered scabbard 23. Scabbard 23 outer flexible or spring mounted bearing 24 is mounted to the perimeter of solid hub 25 and is made spring mounted to reduce the stress effect of the dip force or pulse on the blade 21' as it passes by upper tower cowling 17. There is an inner scabbard roller bearing 24' mounted to the rotating inner hollow steel tube section 26 supported by bearings (not shown) on the hub section of tube 30. Rotating tube 26 bearing 24' retains the scabbard 23 and thus the pinned (not shown) blade 21' against centrifugal forces tearing out scabbard 23 and thus blade 21' (blade pitch rotating means not shown). Upper tapered tower section 16 passes though HDPE greased type sleeve bearing 29 attached to nacelle tube 18 and upper tower section 16 passes up though enlarged stationary tube section 30 attached to back partition 30', whereby the end of upper tower section 16 is attached to upper rotating part of roller bearing 31 which absorbs the total thrust of nacelle and hub blade assembly such bearing attached to a reinforced part of the top section of upper tower section 16 such as its circular rib support 33. Transformer, switch gear, controllers, and air handler etc. are located to the front of nacelle 16 depicted as 32 and so positioned to better counter balance the overhung load comprised of the hub, blades, and generator potions of turbine 1 as shown.

While specific embodiments of the present invention have been described, it should be noted that various modifications thereto can be made without departing from the spirit and scope of the invention as defined in the appended claims.

What is claimed is:

1. A method of deploying an offshore wind turbine assembly, said method comprising:
   providing a wind turbine assembly having a tower supporting a turbine head at a first end and a buoyancy tank at a second end;
   mounting said wind turbine assembly horizontally on a vessel;
   using said vessel to transport said wind turbine assembly to an offshore site;
   raising said wind turbine assembly to a vertical condition at said offshore site;
   attaching said wind turbine assembly to one or more anchor weights deployed in the water at said offshore site; and
   attaching blades to said turbine head after raising said wind turbine assembly to said vertical condition.

2. The method of claim 1 wherein said vessel is a catamaran ship.

3. The method of claim 1 wherein said catamaran ship has a U-shaped trough for supporting said wind turbine assembly.

4. The method of claim 1 wherein raising said wind turbine assembly to a vertical condition includes increasing the mass of said buoyancy tank by adding ballast to said buoyancy tank, thereby causing said first end of said tower to tip upwardly, and then using additional means to finish raising said wind turbine assembly into said vertical condition.

5. The method of claim 4 wherein said additional means comprises a hydraulic cylinder.

6. The method of claim 1 wherein attaching said wind turbine assembly to one or more anchor weights includes connecting chains between said anchor weights and said buoyancy tank.

7. The method of claim 6 further comprising removing ballast from said buoyancy tank after connecting said chains, thereby increasing the buoyancy of said buoyancy tank and tensioning said chains.

8. The method of claim 6 wherein said chains are connected to said anchor weights when said anchor weights are deployed at said offshore sight and then connected to said buoyancy tank after said anchor weights are deployed.

9. The method of claim 8 further comprising using balloons to hold said chains in position for connection to said buoyancy tank.

10. The method of claim 1 wherein attaching blades to said turbine head includes using a winch located in said turbine head to hoist blades from said vessel to said head.

11. The method of claim 10 wherein attaching blades to said turbine head includes using inserting each blade into a corresponding scabbard formed in said turbine head and inserting a pin through each scabbard and its corresponding blade.

12. The method of claim 1 further comprising using a second vessel to position and drop said anchor weights at said offshore site.

13. A wind turbine comprising:
    a back nacelle assembly having a shaft; and
    a rotating hub supporting a plurality of blades and rotatively mounted on said shaft by at least one bearing, wherein said bearing is a journal bearing comprising an outer race having an adjustable diameter disposed around said shaft to define a diametrical gap therebetween and a wear band disposed in said diametrical gap between, said outer race having a slit formed therein and a screw bridging said slit, whereby adjustment of said screw varies said diametrical gap.

14. The wind turbine of claim 13 wherein said outer race has an oil feed opening formed therein.

15. The wind turbine of claim 13 wherein said wear band is a polished stainless steel wear band.

16. The wind turbine of claim 13 wherein said screw passes through said wear band to retain said wear band in said diametrical gap.

17. The wind turbine of claim 13 further comprising a gap sensor, a controller and a rotary actuator, wherein said controller causes said rotary actuator to adjust said screw in response to feedback from said gap sensor.

18. A wind turbine comprising:
    a back nacelle assembly; and
    a rotating hub rotatively mounted on said back nacelle assembly, said rotating hub including a plurality of scabbards formed therein; and
    a plurality of blades, wherein each blade has a spade end that is received within a corresponding one of said scabbards, and wherein each blade is retained in its scabbard by a pin extending through said scabbard and said blade's spade end.

19. The wind turbine of claim 18 wherein each scabbard is rotatively supported on said rotating hub by one or more bearings.

20. An offshore wind turbine assembly comprising:
    a tower including a tapered lower section having a wide end and a narrow end and a tapered upper section having a wide end and a narrow end, said tapered lower and upper sections being joined together at their respective wide ends;
    a turbine head connected to said narrow end of said tapered upper section;
    a platform including a buoy tank connected to said narrow end of said tapered lower section, wherein said buoy tank is partially filled with ballast such that said buoy tank provides a large mass but also provides buoyancy; and
    a wave piercing cowling rotatively attached to said tapered lower section.

21. The offshore wind turbine assembly of claim 20 further comprising an active sensor controlled thruster attached to said wave piercing cowling.

22. The offshore wind turbine assembly of claim 20 further comprising a streamlined trailing cowling rotatively attached to said tapered upper section.

23. The offshore wind turbine assembly of claim 22 wherein said streamlined trailing cowling is connected to said turbine head such that said streamlined trailing cowling and said turbine head are able to rotate together relative to said tapered upper section.

24. The offshore wind turbine assembly of claim 20 further comprising guy-wire cables connected between said platform and said tower, wherein said guy-wire cables are connected to said tower at or near where said tapered lower and upper sections are joined together.

* * * * *